United States Patent

[11] 3,571,876

| [72] | Inventor | Richard C. Blakesley<br>Holcomb, N.Y. |
|---|---|---|
| [21] | Appl. No. | 769,274 |
| [22] | Filed | Oct. 21, 1968 |
| [45] | Patented | Mar. 23, 1971 |
| [73] | Assignee | The Gleason Works<br>Rochester, N.Y. |

[54] MEANS FOR MOUNTING BLADES IN A CUTTER
8 Claims, 8 Drawing Figs.

| [52] | U.S. Cl. | 29/105 |
|---|---|---|
| [51] | Int. Cl. | B26d 1/00 |
| [50] | Field of Search | 29/103, 105, 105.1 |

[56] References Cited
UNITED STATES PATENTS

| 1,411,390 | 4/1922 | Tibbetts | 29/105 |
|---|---|---|---|
| 1,820,415 | 8/1931 | Wildhaber | 29/105 |
| 1,914,411 | 6/1933 | Earl | 29/105 |
| 2,033,384 | 3/1936 | Marshall | 29/105 |
| 2,766,664 | 10/1956 | Ciallie | 29/105X |
| 3,268,980 | 8/1966 | Blakesley et al. | 29/105 |
| 3,268,981 | 8/1966 | Blakesley | 29/105 |

*Primary Examiner*—Harrison L. Hinson
*Attorneys*—Cushman, Darby and Cushman and Morton A. Polster

ABSTRACT: A face mill cutter is provided with a plurality of completely enclosed slots formed into one face of the cutter to receive cutter blades and clamping means. Each slot has parallel sidewalls and a radially inward bottom wall which is perpendicular to the parallel sidewalls, and a wedge block and clamping block are used in combination to apply radial forces to a cutter blade inserted in a slot. The radial forces are applied by moving the clamping means axially into the slot.

PATENTED MAR 23 1971 3,571,876

INVENTOR
RICHARD C. BLAKESLEY

BY
Cushman Darby & Cushman
ATTORNEYS

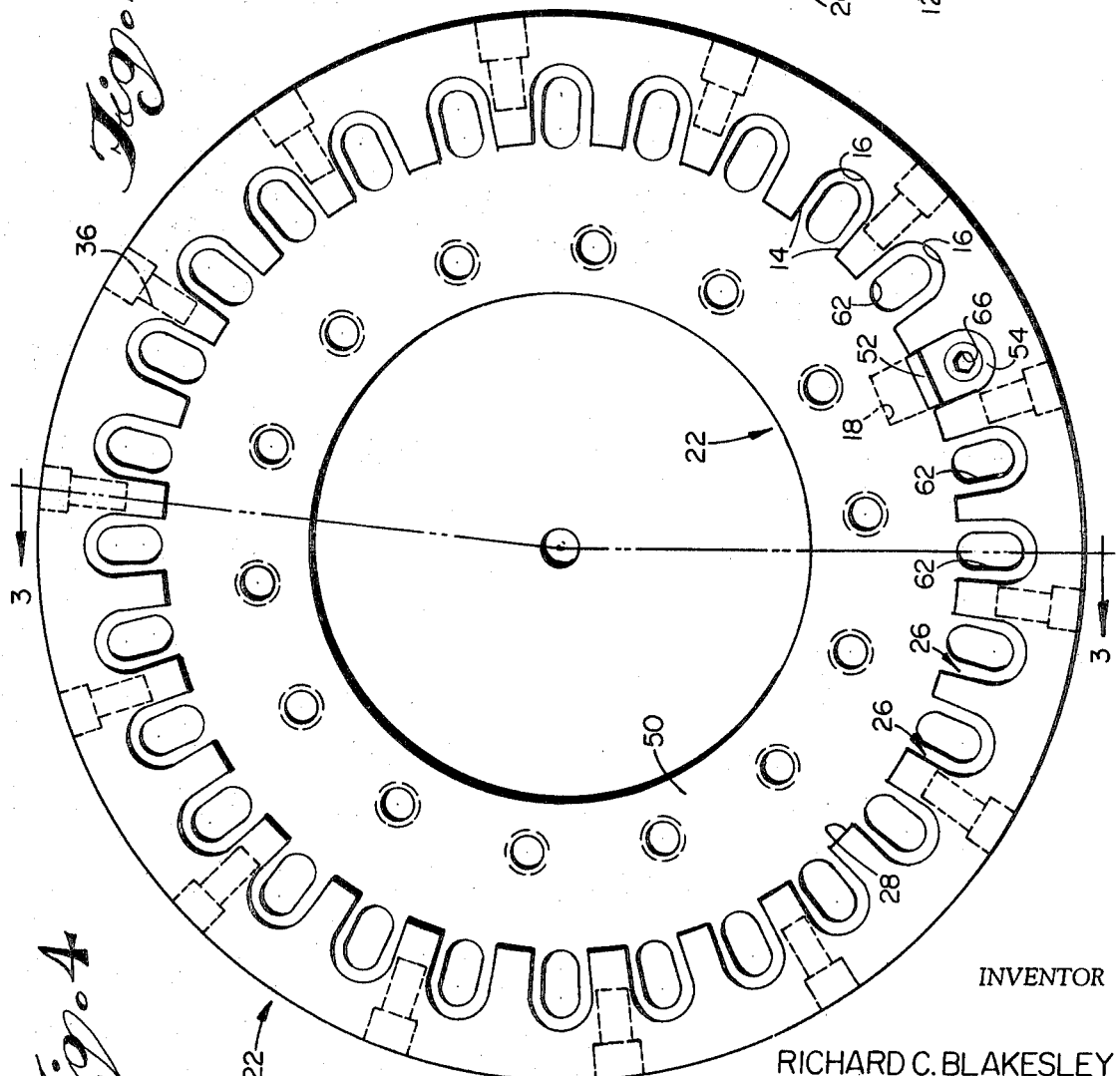
INVENTOR
RICHARD C. BLAKESLEY
BY Cushman Darby & Cushman
ATTORNEYS

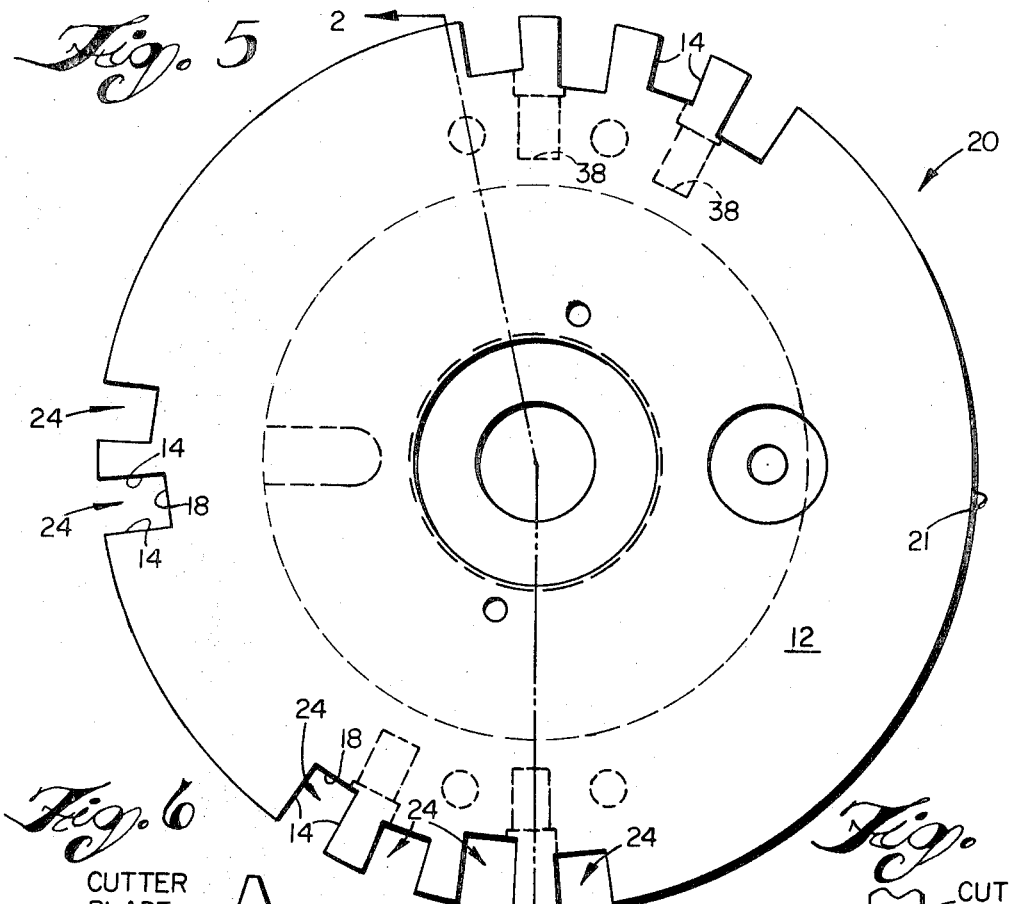
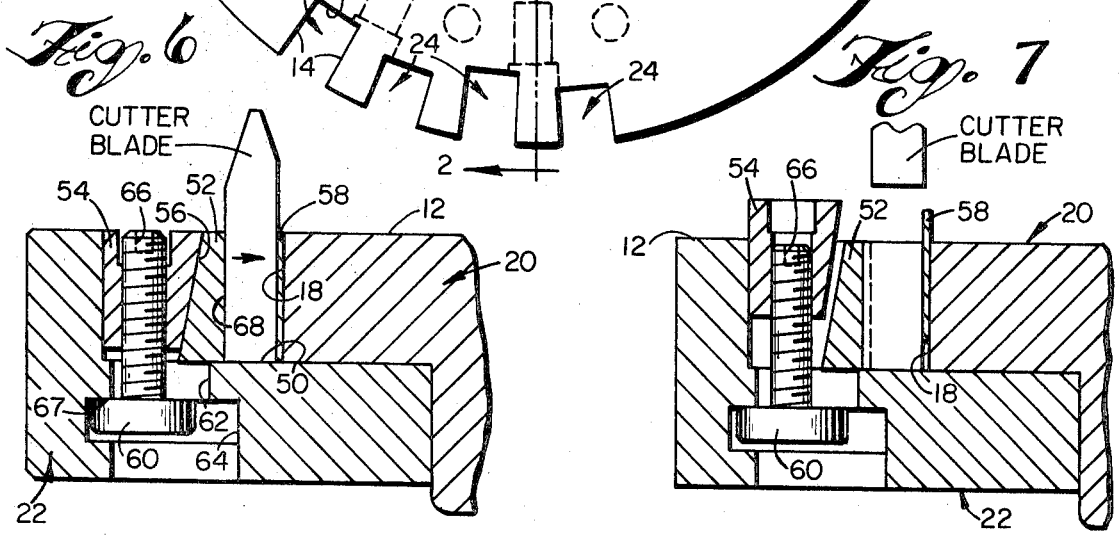
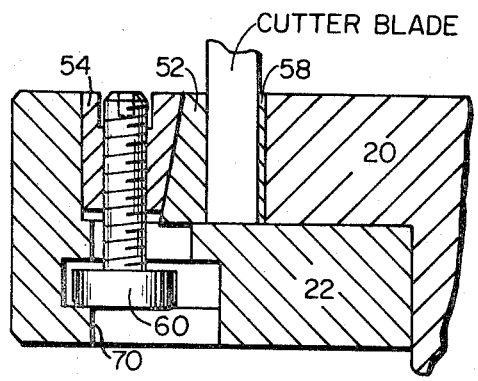
INVENTOR
RICHARD C. BLAKESLEY

MEANS FOR MOUNTING BLADES IN A CUTTER

BACKGROUND AND BRIEF DESCRIPTION OF INVENTION

This invention relates to face mill cutters of the type in which a number of cutter blades are mounted about the circumference of one face of the cutter so that all blades extend away from the face in a common direction. Face mill cutters of this type are useful in cutting spiral bevel and hypoid gears, and the present invention is especially concerned with providing a face mill cutter which may be used in rough cutting operations of such gears. However, the principles of the invention may also be applied to other cutters. In the context of this specification, reference to spiral bevel and hypoid gears is intended to include pinions and spiral bevel gears having zero spiral angles.

It is known in this art to provide face mill cutters in a plurality of slots formed about the periphery of a cutter head, and various means have been known for securing individual cutter blades in each blade-receiving slot provided in the cutter head. For example, Blakesley et al. U.S. Pat. No. 3,268,980 of Aug. 30, 1966 and Blakesley U.S. Pat. No. 3,268,981 of Aug. 30, 1966, each disclose face mill cutters having blade-receiving slots formed in spaced positions about the periphery of the cutter so as to receive individual cutter blades and mounting blocks which are used for securing the blades in their respective positions. However, it can be seen by a reference to the just mentioned patents that there is a limit to the number of slots which can be formed into a cutter head because each of the slots of these patents require additional recesses in their sidewalls to receive T-shaped bridge pieces which assist in a securing of individual blades into the slots. It can be appreciated that the periphery of the cutter is weakened somewhat by the removal of additional material in the sidewalls of the individual blade-receiving slots, and therefore, there is a practical limit as to how many slots can be formed in such a cutter arrangement. Also, it is known to form slots into the periphery of a cutter head and to mount individual cutter blades into the slots by mounting screws which are received into bores formed into the cutter head. It can be appreciated that such a mounting arrangement also limits the number of slots which can be formed into the cutter head because of the removal of stock which is required to form the bores.

In contrast to the prior art, the present invention provides a cutter assembly which permits a greater number of blades to be mounted in any given diameter of a cutter, and individual blades are secured by a novel wedging arrangement which provides a tight and rigid mounting of each blade in its individual blade-receiving slot. It is important to be able to provide a greater number of blades in a given cutter construction in order to increase cutting rates with modern gear cutting machinery capable of operating at higher speeds. Such machinery is disclosed and described in a number of patent applications filed by Gleason Works on Oct. 1, 1968 under the following titles and inventorship:

"Improvements in Bevel Gearing Making"—Ernst J. Hunkeler and Felix P. Wrubleski

"Improvements in Control Arrangements for Bevel Gear Making Machines"—Ernst J. Hunkeler, William G. Buchanan and Richard S. Buxton "Improvements in Ratio-Change and Set-Over Mechanisms in Bevel Gear Making Machines"—Ernst J. Hunkeler, Charles B. King, Ralph E. Klubertanz and Ralph M. Webster "Workhead Assembly and Mounting Therefor, In Bevel Gear Making Machines"—Ernst J. Hunkeler, E. Roy Beman and Frank M. Whalley "Improved Cradle Assembly for Gear Cutting Machines and Means for Moving Cradle Axially"—Ernst J. Hunkeler, Frank A. Smith and Frederick C. Walrath "Means for Supporting Cradle and Cradle Housing"—Ernst J. Hunkeler, Frank A. Smith and Felix P. Wrubleski "Means for Balancing Cradle of Gear Cutting Machine"—Ernst J. Hunkeler, Charles E. Remmeli and Robert A. Waasdorp "Apparatus for Transferring Work Blanks and Work Pieces in Bevel Gear Making Machines"—Lawrence R. Helfer and Ernst J. Hunkeler "Control Apparatus for Checking and Controlling Sequential Machine Operations"—Ernst J. Hunkeler and Robert A. Waasdorp "Checking Means for Determining Stock Division and Seating of a Gear Piece in a Bevel Gear Making Machine"—Ernst J. Hunkeler and Richard S. Buxton In accordance with the present invention, a cutter assembly is provided with individual blade-receiving slots which have parallel sidewalls that are spaced from one another only for a sufficient distance to receive a cutter blade between them. No grooves or lateral recesses are formed in the sidewalls, and therefore, the relatively narrow blade-receiving slots can be positioned more closely together in the face of a cutter, and a greater number of blades can be received in the cutter assembly. The blade-receiving slots are completely enclosed by parallel sidewalls, a radially outward end wall, and a radially inward bottom wall. A clamping means is inserted into a portion of each slot adjacent to a cutter blade so as to apply a radial clamping force to the cutter blade, and the clamping means comprises a clamping block which can be moved axially against a clamping wedge to apply such radial force to a cutter blade. The clamping block is moved axially by a clamping screw member which bears against a back surface of the cutter assembly to draw the clamping block into the blade-receiving slot. In this way very effective blade retention is achieved with a minimum of stock removal for each blade-receiving slot.

These and other advantages of the present invention will become apparent in the more detailed discussion which follows, and in that discussion reference will be made to the accompanying drawings as briefly described below.

BRIEF DESCRIPTION OF DRAWINGS

FIG. 2 is a cross-sectional view of a head member portion of the assembly, as seen on line 2–2 of FIG. 5;

FIG. 3 is a cross-sectional view similar to that of FIG. 2 but showing a backing ring member which is assembled with the head member, the sectional view being taken on line 3–3 of FIG. 4;

FIG. 4 is a front plan view of the face of the backing ring member of FIG. 3;

FIG. 5 is a front plan view of the face of the cutter head member shown in FIG. 2, but shown in a different scale from the FIG. 2 illustration;

FIG. 6 is a sectional view of an outer peripheral portion of the cutter assembly, showing an individual cutter blade and associated clamping means in a blade-receiving slot;

FIG. 7 is a view similar to FIG. 6 and illustrating a step of inserting or removing a blade from its blade-receiving slot; and FIG. 8 is a further view similar to FIG. 6, illustrating a relative positioning of elements when a blade is being released from the cutter assembly.

DETAILED DESCRIPTION OF DRAWINGS

Figure 1:
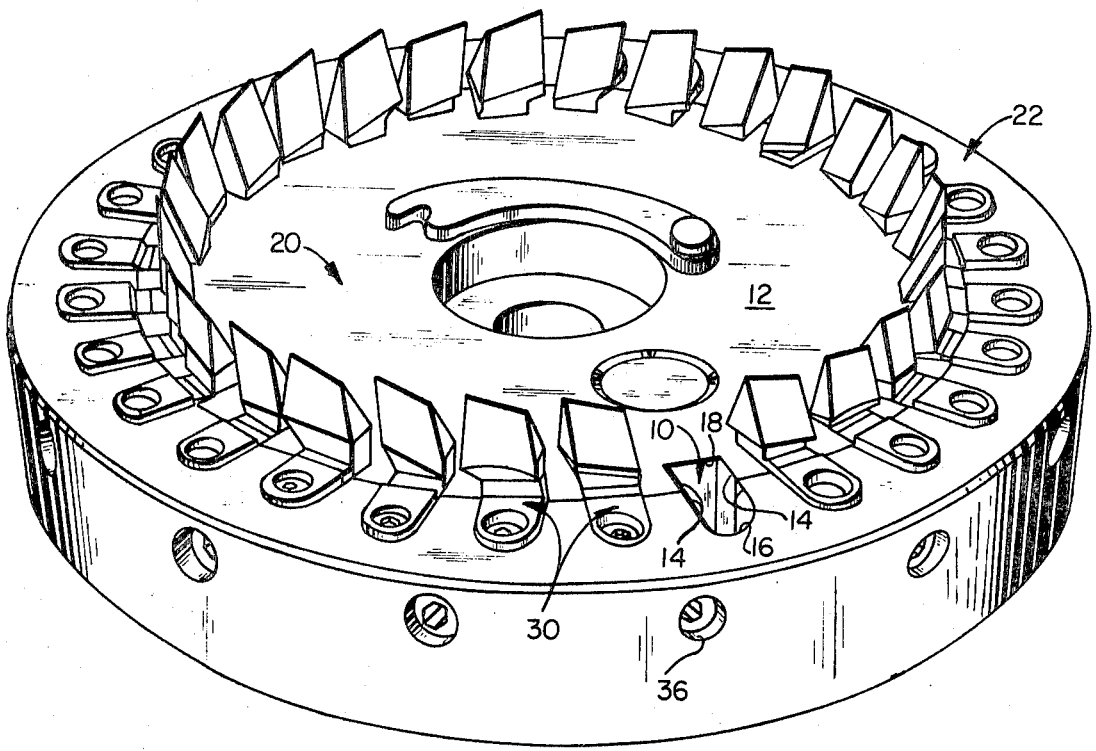
FIG. 1 is a perspective view of a face mill cutter assembly of this invention.

Referring to FIG. 1, it can be seen that the face mill of this invention is generally cylindrical in form and includes a plurality of blade-receiving slots 10 formed into a face 12 of the cutter assembly. A surface 12 of the assembly may be considered the front face of the cutter, and it can be seen that all blades which are carried by the cutter project in a common direction outwardly from the front face 12. In the FIG. 1 illustration, blades are shown in all of the slots except one, and that slot is left empty for purposes of illustrating the invention. However, it is to be understood that all slots receive individual cutter blades when the cutter is assembled for actual use in gear cutting operations. Generally, each slot 10 is formed as a completely enclosed slot on the face of the cutter assembly. Each slot is relatively narrow and elongate in form and is defined by two sidewalls 14, a radially outward end wall 16, and a radially inward bottom wall 18. The sidewalls 14 are parallel to one another and flat with no additional material removed from them as was required in the face mill cutters of the above identified patents. The bottom wall 18 of each slot 10 is preferably perpendicular to the two sidewalls 14.

In the illustrated embodiment of the invention, the cutter assembly is made up of a head member 20 and a backing ring member 22. The head member and backing ring member are assembled together to form a complete face mill cutter assembly, and it can be seen that individual slots 10 are formed by shaping first portions 24 into the periphery of the head member 20 so as to extend all the way through the head member from its front face 12 to its back face. A second portion of each slot is shaped into the backing ring member 22 in a radially outward direction from an inner circular surface 28 of the backing ring member. The second portions 26 are not formed all the way through the backing ring member, and the reason for this will be understood in a later discussion which refers to the more detailed drawings. Thus, it can be seen from FIG. 1 that there is provided a face mill cutter assembly having a relatively large number of cutter blades secured in spaced positions about a face of the cutter, and each cutter blade is positioned within a slot which is of a shape and configuration to receive the cutter blade and clamping means 30 which functions to apply a radial force to the cutter blade so that it is tightly secured in its slot.

Referring to the detailed illustrations of FIGS. 2 through 5, it can be seen that the face mill cutter assembly is made up of two basic parts which comprise a generally circular head member 20 which has a surface 21 fitted within a surface 28 of backing ring member 22. As can be seen from the sectional views of FIGS. 2 and 3, the reduced diameter portion 32 of the head member 20 is received into a central opening 34 of the backing ring member 22. When the two members are in assembled condition, they are secured together by the use of threaded screw members inserted into bores 36 formed through the periphery of the backing ring member. Of course, it is to be understood that a number of such bores 36 are spaced about the entire ring member 22 so as to become aligned with threaded bores 38 formed into the peripheral surface of the head member 20. In this manner, the head member 20 can be tightly secured into the backing ring member 22. It should be noted that the sectional view of FIG. 3 shows only one slot portion 26 formed into the ring member, but additional slot portions 26 are formed radially outwardly into the ring member around the entire circumference of the inner surface 28, as shown for example in FIG. 4. When the head member 20 is assembled with the backing ring member 22, first and second slot portions are aligned between the two members to form complete slots 10 as shown in FIG. 1. Thus, each of the parallel sidewalls 14 of the backing ring member 22 (one such pair of walls being labeled in FIG. 4 for one of the slot portions 26) is aligned with corresponding parallel sidewall portions 14 of the head member 20 (a number of such sidewall portions being labeled in FIG. 5 for slot portions 24). The FIG. 5 illustration shows a representative number of first slot portions 24 formed into the head member 20, but it is to be understood that such slot portions continue all the way around the periphery of the head member 20 so that an equal number of slot portions 24 are provided for alignment with the number of slot portions 26 shown in the backing ring member of FIG. 4. Also, it is to be understood that the parallel spacing of the sidewalls 14 for the first and second slot portions are approximately equal so that a relatively flat and uninterrupted (in the sense that no stock is removed) sidewall is provided on each enclosed slot 10 when the cutter is assembled.

The head member 20 functions to receive and precisely locate each cutter blade which is to be received in each blade-receiving slot 10. Thus, the sidewalls 14 of the first slot portion 24 are preferably carefully formed to be parallel to one another and to be perpendicular to a bottom wall 18. The bottom wall 18 extends completely through the head member 20, as do the sidewalls 14, and it is preferred that the bottom wall 18 extends through the cutter head in a flat plane which is perpendicular to the plane of rotation of the cutter assembly, (as better seen in FIGS. 6 through 8). Thus, the slot portions 24 which are formed in the head member 20 are generally orthogonal in shape and are formed with sufficient precision to precisely locate the radial position of a cutter blade in the slot. However, it is to be understood that the bottom wall 18 may be inclined away from a perpendicular position relative to the plane of rotation of the cutter if it is desired to provide means for radially adjusting individual cutter blades once they are in position in their respective slots. The use of an inclined bottom wall in combination with an adjustment wedge is well-known in this art as shown for example in Thomas U.S. Pat. No. 2,930,112 and Whitmore U.S. Pat. No. 3,192,604. As shown in FIG. 5, the slot portions 24 may be formed for varying radial depths into a head member to accommodate alternating radial positioning of cutter blades in a given cutter setup.

The backing ring member 22 has functions of (a) defining radially outward portions 26 of each of the slots 10 and (b) defining the axial position of each cutter blade in its respective slot. As shown in FIG. 3, the backing ring member 22 has an upstanding portion about its periphery, and the slot portions 26 are formed only into this upstanding portion. A central portion 50 of the backing ring member provides a backing surface against which the shank of a cutter blade is positioned when the cutter blade is inserted into a slot 10 (see FIG. 6 for the positioning of a cutter blade on backing surface 50). The backing surface of the backing ring member functions to limit axial movement of each cutter blade in a direction toward the back face of the cutter assembly, and this permits the use of relatively simple cutter blades which do not require precise formations of shoulders for fixing axial positions (as required for example in the U.S. Pat. Nos. 2,930,112 and 3,192,604). In order to provide such a backing surface to limit axial movement of each cutter blade, it is necessary that the slots 10 extend only part of the way through the cutter assembly, and the illustrated embodiment provides a preferred arrangement for forming completely enclosed precision slots into the face of a cutter while at the same time providing a closed base surface in each slot for limiting axial movement of cutter blades.

As discussed above, each of the elongate slots 10 is of a sufficient radial length to receive a cutter blade and clamping means 30 which functions to apply a radial force against the cutter blade in a direction towards the bottom wall of the slot in which it is located. The clamping means of this invention comprises a combination of a clamping wedge element 52 with a clamping block element 54. The clamping wedge and clamping block elements have mating surfaces at 56 which are angled with respect to the axis of rotation of the cutter so that a wedging action can be applied against a flat surface of a cutter blade which is in contact with the clamping wedge element 52. FIG. 4 illustrates the relative positions of clamping wedge and clamping block elements 52 and 54 in one of the slots portions 26 of he backing ring member. It can be seen that the clamping block means 54 is shaped to fit the curved end wall 16 of the blade-receiving slot. FIGS. 6 through 8 illustrate the wedging action which is obtained when the clamping elements 52 and 54 are inserted into a radially outward portion 26 of a slot 10. It can be seen that the clamping means is fitted immediately adjacent to a cutter blade so that there is great frictional contact between the clamping wedge element 52 and the cutter blade. FIGS. 6 through 8 also illustrate the use of a parallel element 58 which may be used to set the radial position of a cutter blade relative to the bottom wall 18 of a slot. Parallels are formed with precise dimensions so that cutter blades can be positioned relatively precisely in a face mill cutter and at desired radial positions.

FIGS. 6 through 8 also illustrate means for moving or drawing the clamping assembly axially into a slot 10 so as to apply a radial force against a cutter blade contained within the slot. A preferred means for effecting axial movement of the clamping means comprises a clamping screw member 60 which has a threaded shank received into a threaded bore of the clamping block 54. Openings 62 are formed completely through the web portion of the backing ring member 22 at each location of a slot so that the threaded end of the clamping screw 60 can be received into the clamping block 54 from the back face of the cutter assembly. It can be seen that the openings 62 include enlarged portions 64 which are intended to accommodate radial shifting of the head end of the clamping screw 60, but the openings 62 are not large enough for the head of the clamping screw to pass through the backing ring member toward the front face of the cutter assembly. Preferably, the clamping screw member includes a noncircular recess 66 at an end opposite to the head of the screw, and this recess permits a rotation of the screw from the front face of the cutter. Such rotation is desirable when cutter blades are being removed or replaced into the cutter assembly and when final tightening of the cutter blades is being effected. A tool which fits the irregular shape of the recess 66 may be used for turning the clamping screw 60 from the front face of the cutter assembly.

FIG. 6 illustrates relative positions of a cutter blade and associated clamping means in a single slot 10 when all elements are in a tightened condition. It can be seen that the clamping block 54 has been drawn axially into the slot, and the head of the clamping screw 60 is restrained from axial movement by a bearing surface 67 provided in the opening 64 which is formed into the back face of the backing ring member 22. When the clamping block 54 is drawn downwardly (as viewed in FIGS. 6 through 8), its inclined surface 56 applies a wedging action against the clamping wedge 52, and a radial force (in the direction of the arrow) is applied against a flat surface 68 of the cutter blade. An opposite flat surface of the cutter blade contacts the parallel 58, and thus, there is a very tight frictional contact of all elements which provides optimum blade retention with a minimum removal of material from the cutter assembly.

FIG. 7 illustrates relative positions of a cutter blade and of the clamping means associated therewith when a blade is being inserted into or removed from one of the slots 10. When the clamping screw 60 is withdrawn from its threaded engagement with the clamping block 54, the clamping block 54 can be lifted for a sufficient distance to allow the clamping wedge element 52 to be moved radially outwardly in the slot 10. This permits an insertion or removal of a cutter blade into the cutter assembly without a complete disassembly and removal of the clamping elements 52, 54 and 60. Once a cutter blade and any desired thickness of a parallel 58 are inserted into the bottom end of a slot 10, the clamping block 54 can be drawn back into the slot by turning the clamping screw 60 in a direction to thread the screw 60 into the clamping block 54. Continued rotation of the clamping screw 60 results in a final wedging of the wedge element 52 against the cutter blade.

FIG. 8 illustrates a condition which may arise when it is desired to remove a cutter blade from a cutter assembly. Such removal may be required for a sharpening or replacement of cutter blades, and it can be appreciated that the previously tightened clamping elements have a tendency to remain in tight contact. Accordingly, initial unthreading of the clamping screw 60 may result in the screw moving downwardly in its opening 64 for a short distance which is allowed by the size of the opening. If it is found that the clamping block 54 cannot be raised because of its tight frictional contact with the wedge element 52, the head of the clamping screw 60 can be tapped with a tool to release the clamping block 54 from the clamping wedge 52. Thus, the opening 70 not only provides for an insertion of the clamping screw 60 into the cutter assembly, but it also functions as an access opening for admitting a tool which may be required to tap the clamping screw 60.

Having described the structural features of the present invention, it can be seen that an improved cutter assembly has been provided for receiving and mounting a plurality of cutter blades into precise and tight positions on one face of the cutter assembly. Interchangeable parallels 58 and clamping wedges 52, of varying thicknesses, may be used to position cutter blades in any number of desired radial positions. On the other hand, a single size of clamping block 54 can accommodate a variety of sizes of clamping wedges 52 and parallels 58. As shown in FIGS. 6 through 8, the clamping block 54 may be formed of such a size that it does not reach an axial limit position within a slot 10 for whatever clamping wedges 52 and parallels 58 are intended to be used in the blade-receiving slot. It has been found that the completely enclosed, relatively narrow blade-receiving slots of this invention can be formed in greater numbers on given diameter sized of cutter assemblies without affecting the precision positioning of cutter blades in the assembly. For example, a 7½ inch diameter cutter assembly can carry 28 cutter blades, and a 9 inch diameter assembly can carry 32 cutter blades in accordance with this invention. This represents an increase in the number of blades carried by cutters of this type, especially where such cutters are designed as rougher cutters to be used in gear cutting operations. As mentioned above, the increase in the number of cutter blades per given size of cutter in a gear cutting machine represents an increase in gear cutting rate. In addition, an increase in the number of cutter blades per given size of cutter extends the life of the cutter blades.

I claim:

1. In a face mill cutter having a generally circular form and having a plurality of cutter blades mounted in one face of the cutter to extend outwardly therefrom in a common axial direction, the improvement comprising:

a plurality of completely enclosed blade-receiving slots formed into one face of the cutter is spaced positions adjacent its periphery, each blade-receiving slot having (a) a radially outward end wall, (b) parallel sidewalls which are generally flat, and (c) a radially inward bottom wall which is perpendicular to said parallel sidewalls;

a plurality of individual clamping means each adapted for insertion into a respective one of said blade-receiving slots with a cutter blade, said clamping means including wedge and block elements having mating surfaces inclined at an angle relative to the axis of rotation of the cutter for applying a radial force to a cutter blade when the clamping means is moved axially into a blade-receiving slot in a position radially adjacent to the cutter blade; and means for moving said clamping means axially into the blade-receiving slot.

2. The improvement of claim 1 wherein said means for moving the clamping means axially into a slot comprises a headed screw member which is received through an opening, formed completely through the cutter, and into a threaded bore formed in said clamping block element, and wherein a bearing surface is provided on a back face of the cutter for limiting axial movement of said headed screw member, whereby said clamping block element can be drawn into said slot by turning said headed screw member against said bearing surface and into said threaded bore of the clamping block element.

3. The improvement of claim 1 wherein said blade-receiving slots are formed at alternating varying depths radially toward the center of said cutter to provide alternating positions for cutter blades carried by the cutter.

4. In a face mill cutter assembly having a generally circular form and having a plurality of cutter blades mounted therein to extend out from one face of the cutter assembly, the improvement comprising:

a head member having first portions of blade-receiving slots formed radially inwardly into its periphery;

a backing ring member which can be assembled with said head member, said backing ring member having second portions of blade-receiving slots formed radially outwardly from an inner circular surface of the backing ring member;

means for assembling said head member with said backing ring member so that a plurality of enclosed blade-receiving slots are defined in one face of the assembly, said slots functioning to receive (a) cutter blades and (b) clamping means which secure the cutter blades in said slots;

a plurality of individual clamping means each adapted for insertion into a respective one of said slots with said cutter blades, each said clamping means including wedge and block elements having mating surfaces inclined at an angle relative to the axis of rotation of the cutter assembly, and adapted to be received in radially adjacent positions in said slot to apply a radial force against a cutter blade positioned at the bottom wall end of the slot when said clamping means are drawn axially into said slots; and means for drawing said clamping means axially into said slots.

5. The improvement of claim 4 wherein each of said slots comprises a generally elongate slot having parallel sidewalls and a radially inward bottom wall which is perpendicular to the plane of rotation of said cutter assembly.

6. The improvement of claim 5 wherein said means for drawing the clamping means axially into a slot comprises a headed screw member which is received into a threaded bore formed in said clamping block element, and wherein a bearing surface is provided on said backing ring member for limiting axial movement of said headed screw member, whereby said clamping block element can be drawn into said slot by turning said headed screw member against said bearing surface and into said threaded bore of the clamping block element.

7. The improvement of claim 6 wherein said backing ring member provides a supporting surface for a shank end of each cutter blade which is received in a slot.

8. The improvement of claim 4 wherein said first portions of blade-receiving slots are formed at alternating varying depths radially into the periphery of said head member to provide alternating positions for cutter blades carried by the cutter assembly.